Aug. 9, 1960    H. J. HOFF ET AL    2,948,309
CHAIN SAW BAR CONSTRUCTION
Filed April 26, 1955    2 Sheets-Sheet 1
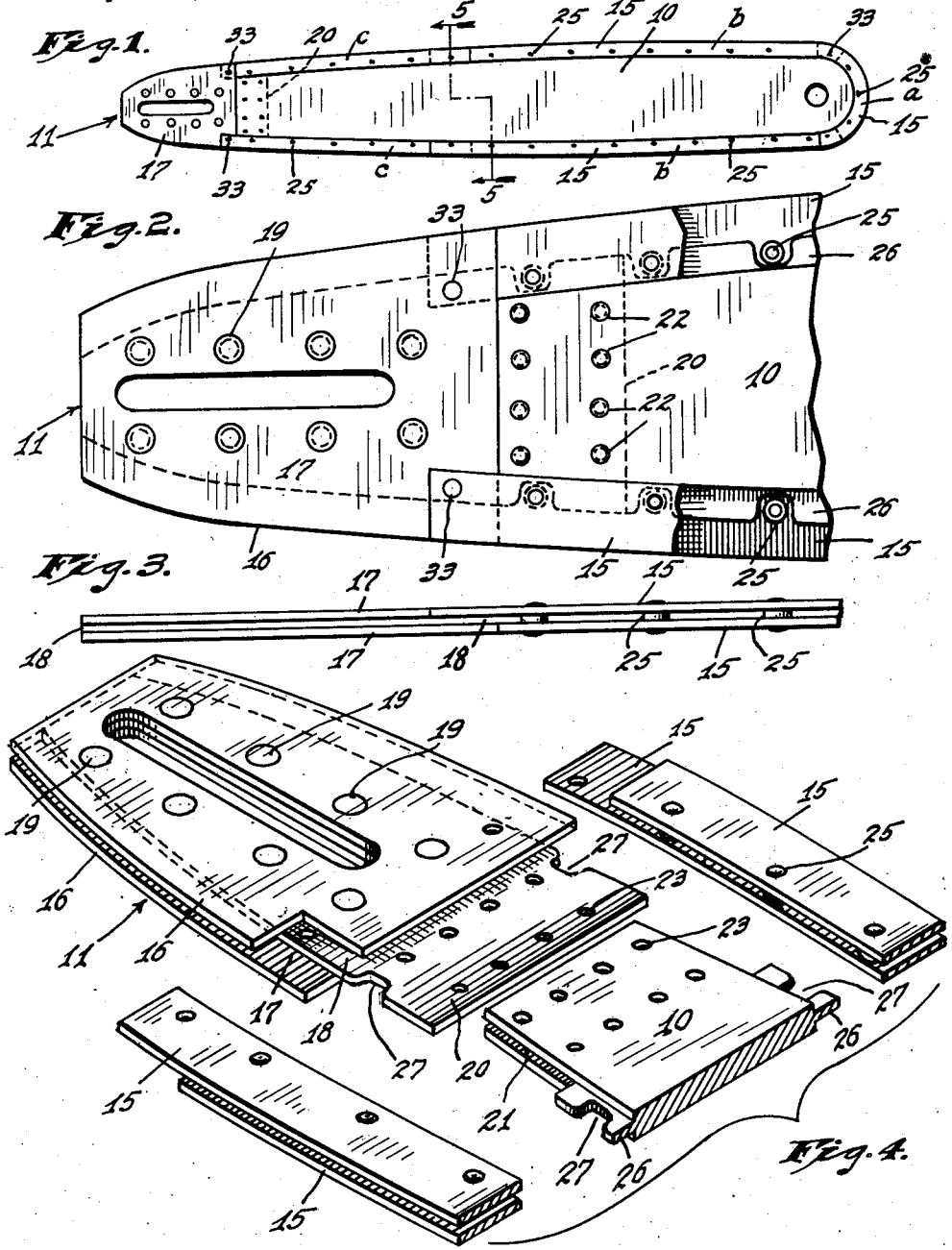
INVENTORS
Harry J. Hoff and
BY Stephen J. Hoff,
ATTORNEYS.

Aug. 9, 1960 H. J. HOFF ET AL 2,948,309
CHAIN SAW BAR CONSTRUCTION
Filed April 26, 1955 2 Sheets-Sheet 2

INVENTORS
Harry J. Hoff and
BY Stephen J. Hoff,
ATTORNEYS.

United States Patent Office 2,948,309
Patented Aug. 9, 1960

2,948,309

CHAIN SAW BAR CONSTRUCTION

Harry J. Hoff and Stephen J. Hoff, Richmond, Ind., assignors to Hoffco, Inc., Richmond, Ind., a corporation of Indiana Filed Apr. 26, 1955, Ser. No. 503,870

2 Claims. (Cl. 143—32)

This invention relates to cutter-bars for chain saws. Such bars are customarily provided with a peripherally extending groove which receives tongues provided on links of the saw chain to maintain the chain in the plane of the cutter-bar. Thrust reflecting the feeding effort is transmitted to the cutter-bar through engagement of the tooth-bearing chain links with the edge of the cutter-bar at the sides of the aforesaid groove. In operation, such thrusts may be of great magnitude and tend to cause rapid wear of the thrust-receiving surfaces of the cutter-bar.

It is an object of this invention to provide an improved cutter-bar for chain saws and more particularly to extend the life of the cutter-bars.

In carrying out the invention we form at least a part of the peripheral portion of the cutter-bar as a separate element which will take the wear incident to operation of the saw and which can readily be replaced on the cutter-bar when it becomes badly worn. Preferably, the entire chain-engaging periphery of the cutter-bar is provided with such wear-taking elements, although, if desired, they may extend along the cutter-bar periphery only over that portion thereof where wear is heaviest. The edge of the bar-body and the inner edge of each wear-taking element possess cooperating provisions holding them in coplanar relationship, and the outer portion of each wear-taking element comprises parallel, spaced flanges or rails the edges of which take the thrust from the chain and the space between which receives the chain-guiding tongues. Where wear-taking elements are contiguous at the periphery of the cutter bar, the two rails of each element are desirably staggered so that the joints in the two rails do not occur in the same plane.

The accompanying drawings illustrate the invention.

Fig. 1 is a plan view of a cutter-bar substantially the whole chain-engaging periphery of which consists of replaceable wear-taking elements;

Fig. 2 is a fragmental plan view similar to Fig. 1 but on an enlarged scale and with portions of the wear-taking elements taken away;

Fig. 3 is an elevational view of the construction illustrated in Fig. 2;

Fig. 4 is an isometric, exploded view of the construction shown in Figs. 2 and 3;

Figure 9:
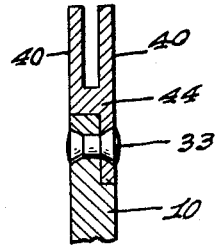

And Fig. 9 is a transverse section showing yet another modification.

Figure 5:
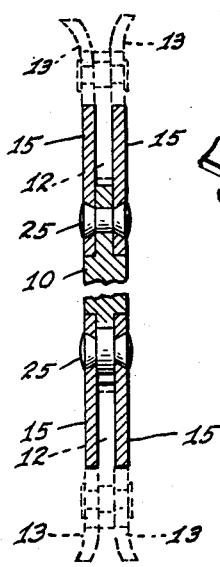
Fig. 5 is a transverse section on the line 5—5 of Fig. 1.

The cutter-bar 10 illustrated in the drawings has a heel portion 11 adapted for attachment to the frame of the saw. The entire chain-engaging periphery of the bar is provided with a medial groove to receive and guide the tongues 12 (Fig. 5) on links of the chain 13. Over at least the outer end of the bar 10, and preferably along its sides as well, the tongue-receiving groove is defined by replaceable wear-taking rails 15 which, by engagement with side plates of the saw-chain, transmit feeding effort and other thrust between the cutter-bar and the chain. Over that portion of the chain-engaging periphery of the bar not occupied by replaceable rails 15 the tongue-receiving groove is provided by flanges 16 projecting in parallel spaced relation from the bar.

In the particular bar shown in the drawing, the heel portion 11 is not integral with the balance of the bar, but instead is a separate element rigidly connected to the body of the bar. As shown, the heel section 11 is of laminated construction, comprising outer plates 17 and an intermediate plate 18, such plates being secured rigidly together as by rivets 19 or in any other convenient manner. Along the sides of the heel section, the top and bottom plates 17 project outwardly beyond the intermediate plate 18 to provide the groove-defining flanges 16. At the outer end of the heel section, the intermediate plate projects outwardly beyond the outer plates to provide a tongue 20 received in a groove 21 extending transversely across the inner end of the body section 10. The overlapping portions of the two sections 10 and 11 of the bar may be held together in any convenient manner, as by rivets 22 passing through aligned holes 23 in the tongue 20 and the walls of groove 21.

The sectional bar construction is not essential, but it has the advantage that the body section 10 may be made of relatively light-weight metal while the heel section 11, which is attached to the frame of the saw and which therefore is subjected to stresses of comparatively large magnitude, may be made of heavier, stronger metal.

In the cutter-bar of Figs. 1 to 5, substantially the entire chain-engaging periphery of the bar is provided with rails 15 formed of flat stock, the rails are in sections, and opposed rail-sections are secured together independently of their connection to the cutter-bar body 10 to form a wearing element capable of being applied to and removed from the bar-body as a unit. As shown one of such units, designated $a$ in Fig. 1, is of a general semi-circular shape to embrace the outer end of the bar-body, while other such units, $b$ and $c$, extend along the sides of the bar; the inner ends of the rails 15 of the rearmost units $c$ abutting the flanges 16. To hold opposed rail-sections together, they may be interconnected by shouldered rivets 25 spaced at appropriate intervals along their extent. To locate each wearing element in the plane of the bar-body, the edges of the latter are provided with rabbet grooves defining a medial flange 26 snugly receivable between the inner edge portions of the rails 15, such flanges being provided with notches 27 providing clearance for the rivets 25 and permitting the inner edges of the rails to seat against the conforming shoulders at the base of the flange 26.

Figure 6:
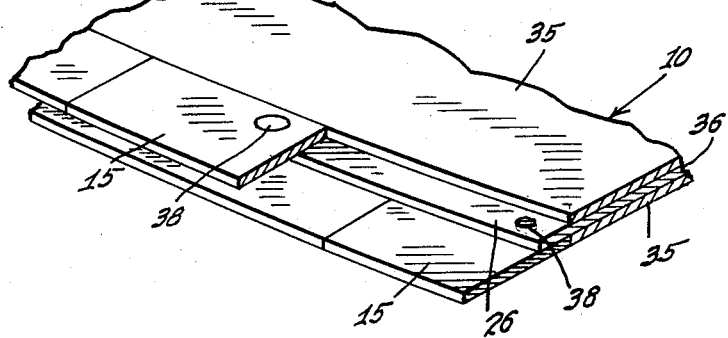
Fig. 6 is a fragmental isometric view illustrating a modified construction for the wear-taking elements.

The wearing elements are held in position on the cutter-bar in any convenient manner which will permit their release and their removal without damage to the bar. As shown, the wearing elements and the flange 26 are provided with aligned openings for the reception of attaching rivets 33. Where, as is the case in Figs. 1 to 4, wearing elements are arranged contiguously, the joints in the upper and lower rails 15 are broken or staggered, so that they will not occupy a common plane. Such broken or staggered arrangement in joints of the upper and lower rails is also desirably employed at the inner ends of the rearmost rails, where they meet the flanges 16. This arrangement makes for smoother chain operation and decreased wear at the joints between contiguous rails and also makes it possible for adjacent ends of contiguous rails to be secured to the cutter-bar by a single rivet 33, The structure illustrated in Fig. 6 differs from that shown in Figs. 1 and 5 in two respects. In the first place, the entire cutter-bar is of a laminated construction comprising outer plates 35 and an intermediate plate 36, the edges of the intermediate plate 36 projecting outwardly beyond the edges of the plates 35 to provide the flanges 26. In the second place, opposed sections of the rails 15 are not interconnected to each other independently of their connection to the cutter-bar, but instead are shown as secured to the outer bar by rivets 38 which pass through both rails and the flange 26.

Figure 7:
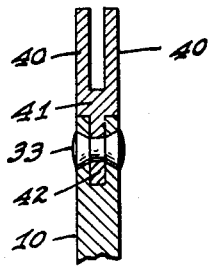
Fig. 7 is a transverse section illustrating a further modification.
Figure 8:
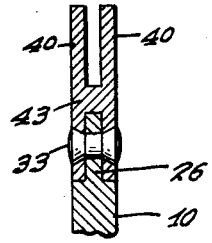
Fig. 8 is a transverse section illustrating still another modification.

In the structure shown in Figs. 7, 8, and 9, the rails, instead of being separate strips of metal, are spaced, groove-defining flanges 40 provided on a unitary metal strip. In the arrangement of Fig. 7, the inner edges of such a strip 41 are rabbeted to provide a tongue 42 snugly received in a peripherally extending groove of the cutter-bar 10. In the arrangement of Fig. 8, the flanges 40 are on a strip 43 of H-shaped cross section, a median groove in its inner edge of such strip receiving the flange 26 of the cutter-bar. In Fig. 9, the meeting edges of the wearing element 44 and the cutter-bar 10 are grooved to provide a simple lap joint rather than the tongue-and-groove joint of Figs. 5, 7, and 8. Rivets 33, or other appropriate means, may be used to hold the wearing elements on the bar 10.

The rails 15, whether they are formed of flat stock as in Figs. 1 to 6 or are spaced flanges 40 of an integral strip, may be made of any appropriate metal and suitably heat-treated to improve their wear resistance. Whether secured to the bar-body by rivets 33 or 38 or in any other releasable manner they can be replaced when they become worn to an extent which interferes with proper operation of the saw. The rails may occupy any desired portion or portions of the periphery of the cutter-bar, but will in most instances extend at least around the outer end of the bar, as do the sections indicated at $a$ in Fig. 1.

We claim as our invention:

1. A cutter-bar for a chain saw, said bar having along its opposite side edges and around its end a medial groove for the reception of guiding tongues on a saw chain and comprising a plate-like body, that portion of said groove extending around the end of the bar being defined by spaced, parallel rails of a wearing element, the edge of the bar-body and the inner edge of said wearing element having overlapping flanges locating the wearing element in the plane of the bar-body, said rails being rigidly connected within the wearing element whereby such element may be applied to and removed from the bar body as a unit, and means for securing the wearing element to the bar-body, said rails being parallel metal strips secured together in parallel spaced relation by shouldered rivets, the flange on said bar-body being medially located and the inner edge portions of the strips constituting the flanges of the wearing element.

2. A cutter-bar as set forth in claim 1 with the addition that the flange on the bar-body is notched to receive the shoulders of said rivets.

References Cited in the file of this patent
UNITED STATES PATENTS

| 1,397,026 | Wolf | Nov. 15, 1921 |
| 2,165,524 | Wolf | July 11, 1939 |
| 2,316,997 | Smith | Apr. 20, 1943 |
| 2,359,230 | Shade | Aug. 29, 1944 |
| 2,622,636 | Cox | Dec. 23, 1952 |
| 2,693,206 | Anttonen | Nov. 2, 1954 |
| 2,728,566 | Barnett | Dec. 27, 1955 |

FOREIGN PATENTS

| 110,447 | Sweden | Apr. 25, 1944 |
| 728,639 | Germany | Dec. 1, 1942 |